(12) United States Patent
Sampath

(10) Patent No.: US 11,745,630 B2
(45) Date of Patent: Sep. 5, 2023

(54) PASSIVE SAFETY SYSTEM HAVING AN ENERGY CONVERSION DEVICE

(71) Applicant: Naveen Gopal Sampath, Thanjavur (IN)

(72) Inventor: Naveen Gopal Sampath, Thanjavur (IN)

(*) Notice: Subject to any disclaimer, the term of this patent is extended or adjusted under 35 U.S.C. 154(b) by 0 days.

(21) Appl. No.: 17/498,709

(22) Filed: Oct. 11, 2021

(65) Prior Publication Data

US 2023/0110751 A1     Apr. 13, 2023

(51) Int. Cl.
*B60N 2/42* (2006.01)
*B60N 2/427* (2006.01)
*B60N 2/68* (2006.01)

(52) U.S. Cl.
CPC ....... *B60N 2/4214* (2013.01); *B60N 2/42709* (2013.01); *B60N 2/42754* (2013.01); *B60N 2/68* (2013.01)

(58) Field of Classification Search
CPC .......................... B60N 2/4214; B60N 2/42709
See application file for complete search history.

(56) References Cited

U.S. PATENT DOCUMENTS

| | | | | |
|---|---|---|---|---|
| 6,742,838 B1* | 6/2004 | Swierczewski | ...... | B60N 2/4279 |
| | | | | 297/216.1 |
| 2019/0389336 A1* | 12/2019 | Malinowski | ......... | B60N 2/4214 |

FOREIGN PATENT DOCUMENTS

| | | | | |
|---|---|---|---|---|
| AT | 516977 B1 * | 8/2018 | ............... | B60N 2/07 |
| DE | 19859238 A1 * | 7/2000 | ........... | B60N 2/1615 |
| DE | 102020108799 B3 * | 7/2021 | | |
| DE | 102021106873 A1 * | 9/2022 | | |
| DE | 102021106948 A1 * | 9/2022 | | |
| WO | WO-2019038455 A1 * | 2/2019 | ............. | B60N 2/067 |

* cited by examiner

*Primary Examiner* — Timothy J Brindley
(74) *Attorney, Agent, or Firm* — FORGE IP, PLLC

(57) ABSTRACT

A passive safety system is provided for a vehicle. The passive safety system includes a support frame configured to be secured on the vehicle in a fixed position and a support surface configured to support a payload carried by the vehicle. The support surface is configured to float with respect to the support frame. The passive safety system includes an energy conversion device between the support frame and the support surface, and includes a frictional surface configured to engage a portion of the support surface when the support surface tends to move in a predetermined direction with respect to the support frame to thereby convert kinetic energy of the support surface into frictional energy and increase the stopping/braking distance.

20 Claims, 19 Drawing Sheets

PASSIVE SAFETY SYSTEM HAVING AN ENERGY CONVERSION DEVICE

FIELD OF THE INVENTION

The present invention is directed to a passive safety system for a vehicle, and more particularly, to a passive safety system including an energy conversion device.

BACKGROUND OF THE INVENTION

A conventional passive safety system may include one or more of airbags, seat belts, collapsible steering column, whiplash protection, etc., for occupant protection in the event of crash.

SUMMARY OF THE INVENTION

The present invention recognizes that some conventional passenger restraint systems may have extremely short duration and distance, to decelerate a passenger after a crash, which may lead to high forces being exerted on the passenger, before the passenger is brought to a halt by the conventional passive safety system. The present invention further recognizes that, in some instances, it may be desirable to reduce the forces exerted on other things being carried or transported by a vehicle, such as in an unmanned vehicle.

To solve these and other problems, the present invention provides a passive safety system for a vehicle, the passive safety system comprising a support frame configured to be secured on the vehicle in a fixed position, a support surface configured to support a payload carried by the vehicle, the support surface further being configured to float with respect to the support frame in the same, or substantially the same, position with respect to the support frame, and an energy conversion device between the support frame and the support surface, the energy conversion device including a frictional surface configured to engage a portion of the support surface when the support surface tends to move in a predetermined direction with respect to the support frame to thereby convert kinetic energy of the support surface into frictional energy. In an illustrative example, the support surface can be configured to slide and engage with the energy conversion device in a predetermined direction with respect to the support frame to thereby convert kinetic energy of the support surface into frictional energy. In other examples, the support surface can be configured to float with respect to the support frame such that there is no movement, or substantially no movement, of the support surface relative to the support frame or the vehicle when the vehicle is subject to inertial forces and to engage with the energy conversion device to thereby convert kinetic energy into frictional energy.

In this way, the present invention can provide an improved passive safety system that can operate alone, or in tandem with one or more conventional passive safety systems, and further reduce the forces being exerted on a passenger or other object, for example, in a vehicle crash or impact with another object. As a result, the present invention may thereby prevent, reduce, or limit, for example, a severity of possible injuries to a passenger or damage to a thing being transported by the vehicle during a vehicle crash or impact, braking, emergency braking, landing, etc.

In an example, the energy conversion device can be coupled to the support frame, such that the energy conversion device is rigidly fixed with respect to the support frame. The frictional surface of the energy conversion device can be configured to move or impart a relative motion on a portion of the support surface, in a direction opposite to the predetermined direction to thereby convert kinetic energy of the support surface into frictional energy. Alternatively, in other examples, the energy conversion device can be coupled to the support surface, such that the energy conversion device is rigidly fixed with respect to the support surface. In these examples, the frictional surface of the energy conversion device can be configured to move or impart a relative motion on a portion of the support frame, in a direction opposite to the predetermined direction to thereby convert kinetic energy of the support surface into frictional energy.

In some examples, the frictional surface of the energy conversion device can include a belt configured to move in an opposite direction to the predetermined direction such that a surface of the belt frictionally engages the portion of the support surface. In some other examples, the frictional surface of the energy conversion device can include a roller configured to rotate in an opposite direction to the predetermined direction such that a surface of the roller frictionally engages the portion of the support surface when the support surface tends to move in the predetermined direction. The portion of the support surface can include a surface having a shape corresponding to the surface of the roller.

In some examples, at least one of the support surface and support frame can include at least one guide for guiding a movement of the support surface with respect to the fixed support frame in at least the predetermined direction.

In some examples, the support surface can be movable with respect to the support frame in at least the predetermined direction and an opposite direction to the predetermined direction depending on the vehicle's inertial direction during an impact, braking, landing, etc., for instance in a front or a rear crash scenario. In these examples, the energy conversion device can include a second frictional surface configured to engage the support surface when the support surface tends to move in the opposite direction to the predetermined direction to thereby convert kinetic energy of the support surface into frictional energy. In some examples, the frictional surface of the energy conversion device can be capable of moving in at least the predetermined direction and the opposite direction to the predetermined direction. For example, the frictional surface can be configured to engage the portion of the support surface when the support surface tends to move in the predetermined direction and when the support surface tends to move in the opposite direction to the predetermined direction.

In some other examples, the frictional surface of the energy conversion device can comprise a plurality of rollers including at least a first roller configured to rotate in an opposite direction to the predetermined direction when the support surface tends to move in the predetermined direction such that a surface of the first roller frictionally engages the portion of the support surface, and at least a second roller configured to rotate in the predetermined direction when the support surface tends to move in the opposite direction to the predetermined direction such that a surface of the second roller frictionally engages a second portion of the support surface.

In still other examples, the portion of the support surface can include a plurality of first portions and a plurality of second portions. The frictional surface of the energy conversion device can comprises a plurality of first rollers configured to rotate in an opposite direction to the predetermined direction when the support surface tends to move in the predetermined direction such that a surface of each of the plurality of first rollers frictionally engages one of the plurality of first portions of the support surface, and a plurality of second rollers configured to rotate in the predetermined direction when the support surface tends to move in the opposite direction to the predetermined direction such that a surface of each of the plurality of second rollers frictionally engages one of the plurality of second portions of the support surface.

In other examples, the support surface can be movable with respect to the support frame in a plurality of directions, including the predetermined direction. The energy conversion device can be configured to engage the frictional surface with the portion of the support surface when the support surface tends to move in any of the plurality of directions to thereby convert kinetic energy of the support surface into frictional energy.

In another example, the support surface can be movable with respect to the support frame in a different direction from the predetermined direction and in a same plane as the predetermined direction. The energy conversion device is configured to engage the frictional surface with the portion of the support surface when the support surface tends to move in the different direction to thereby convert kinetic energy of the support surface into frictional energy.

The present invention further recognizes that various sensors may be provided to detect a crash or impact, or an impending crash or impact, of a vehicle with another vehicle or other object. In some examples, the energy conversion device can be configured to receive, from one or more sensors of a vehicle, a signal representing a predetermined change in acceleration of the vehicle, such as a predetermined or threshold deceleration representing a crash or impact, or impending crash or impact. In response to the signal, the energy conversion device can be configured to engage the frictional surface with the portion of the support surface to thereby convert kinetic energy of the support surface into frictional energy.

In some examples, the passive safety system can further comprise a contact arrester mechanism configured to arrest a movement of the support surface with respect to the support frame in a first state and, in response to a signal from the vehicle, to permit the movement of the support surface with respect to the support frame in a second state. In other examples, the passive safety system can further comprise a contact arrester mechanism configured to resist a movement of the support surface with respect to the support frame. For example, the contact arrester mechanism can include one or more spring disposed between the support surface and the support frame. In this way, the one or more springs can arrest a movement of the support surface with respect to the support frame until such time as forces acting on the support plate exceed or overcome the spring force, at which time the support surface will be capable of moving with respect to the support frame.

The contact arrester mechanism can be arranged, for example, between the edges of the support frame and the support surface, or between flanges formed thereon, to arrest the movement of the support surface. The contact arrester mechanism can be configured to release automatically upon detection of a collision or impact by the vehicle sensors, which may assist with establishing physical contact or engagement between the frictional surface of the energy conversion device and the portion of the support surface to thereby convert kinetic energy of the support surface into frictional energy.

In another example, a passive safety system for a vehicle can include a support frame configured to be secured on the vehicle in a fixed position, a support surface configured to support a payload carried by the vehicle, the support surface being movable with respect to the support frame, and an energy conversion device between the support frame and the support surface. When the support surface tends to move in a predetermined direction with respect to the support frame as a result of inertial forces acting on the support surface during deceleration of the vehicle, the energy conversion device can be configured to impart a relative motion on a portion of the support surface in a direction opposite to the predetermined direction to thereby convert kinetic energy of the support surface into frictional energy, which may result in a reduced rate of deceleration of a passenger or other objects being transported on or in the vehicle.

In some examples, the support frame can comprise a seat frame fixedly mounted to the vehicle, and the support surface is a part of a seat of the vehicle.

For purposes of the invention, a "vehicle" is defined as a means for carrying or transporting a payload. For example, a vehicle can include a car, truck, off-road or all-terrain vehicle, bicycle, motorcycle, train, aircraft, watercraft, spacecraft, rover, machine, etc. In some examples, the vehicle may include a manned vehicle, such as a vehicle operated by or carrying one or more persons such as a passenger vehicle, or an unmanned vehicle such as a drone, rover, spacecraft, etc. The vehicle may be operated (e.g., navigated and/or maneuvered) by human control and/or operated without the guidance or input of a human, such as an autonomous or self-driving/self-operating vehicle.

For purposes of the invention, a "payload" is defined as a load carried by a vehicle exclusive of what is necessary for its operation. For example, the payload may include one or more of a driver/pilot, passenger, instruments, cargo, objects, materials, etc., among other things.

For purposes of the invention, a "support frame configured to be secured on the vehicle in a fixed position" is defined as the support frame being coupled (e.g., using fasteners such as bolts or other securing or locking elements) to a part of the vehicle (e.g., either in or on a part of the vehicle) such that the support frame is secured in a locked or fixed position with respect to the vehicle during operation. This is not to say that the support frame cannot be adjustable, positionable, or repositionable in one or more fixed positions with respect to the vehicle, such as, for example, a slidable or translatable seat frame, foldable seat frame, easy entry seat frame, etc. In such cases in which the support frame is adjustable, positionable, or repositionable in one or more fixed positions, the support frame commonly will be secured or locked into a single available fixed position during operation.

The examples of the embodiments of the invention can provide a passive safety system that may be used to minimize the potential for injuries caused to the occupants (e.g., persons) during a crash or impact of the vehicle with another object or vehicle, by considerably reducing the rate of deceleration of the occupants. Similarly, in the case of instruments, cargo, objects, materials, etc., or other things being transported by the vehicle, the examples of a passive safety system may be used to minimize the potential for damage caused to the instruments, cargo, objects, materials, etc., or other things being transported by the vehicle during a crash or impact of the vehicle with another object or vehicle, by considerably reducing the rate of deceleration of such instruments, cargo, objects, materials, etc., or other things being transported by the vehicle.

The examples of the embodiments of the invention can provide a passive safety system having an energy conversion device that is capable of substantially converting the kinetic energy of a payload into frictional energy, both before and while the payload collides with another vehicle safety device or vehicle structure (e.g., both before and while a passenger collides with an airbag, or any other vehicle structure, such as a steering wheel, dash, etc.). The examples of the embodiments of the invention may be extremely useful, for example, in instances in which the payload includes an infant or child occupant where the usage of airbags may not be permitted or safe. The exemplary embodiments of the invention may substantially reduce the force requirement(s) of one or more other passenger restraint systems being used in tandem with the present passive safety system, which may further reduce or limit the forces exerted on the payload during a crash or impact of the vehicle with another object or vehicle.

In some examples, a passive safety system according to the invention can provide advantages in that the deceleration of the payload, such as an occupant, can be achieved without much altering of the position of a surface supporting the payload (e.g., seat cushion) with respect to the vehicle structure. That is, in some examples, a position of the seat cushion is almost unaltered (i.e., substantially unaltered or substantially stationary) relative to the vehicle, during its operation. As a result, the payload (e.g., belted occupant) generally remains stationary relative to the vehicle, while a portion of the system (e.g., a sliding frictional surface of energy absorption device), which engages and supports the seat cushion during a crash, moves relative to the seat resulting in increased stopping distance of the payload/passenger and a reduced rate of the payload/passenger deceleration.

For instance, during a vehicle front crash, a passenger may continue to be in motion and slide forward along the seat cushion (i.e., the passenger continues to be in motion with the same speed and direction as that of an initial condition of the vehicle). If the passenger is constrained using a seat belt during a crash (in the absence of airbag), then the passenger is brought to a state of rest from a state of motion, by the seat belt. Some amount of work is done by the stretchable seat belt (i.e., a moderate amount of stretch in a seatbelt harness can extend the stopping distance) to bring the passenger to rest from motion. One of ordinary skill in the art will recognize that the work done by seat belt will be equivalent to the force exerted by the seatbelt on the passenger, multiplied by the braking/stopping distance of the passenger [Force x Stopping Distance=Kinetic Energy of the Passenger]. Given the kinetic energy of the passenger being constant for a particular vehicle velocity and mass of the passenger, if the braking/stopping distance can be increased, then the force exerted by the seat belt on the passenger can be reduced, which, in-turn, may reduce injuries or a risk of injuries to a passenger during a crash.

The examples of the passive safety system described herein are not limited to any particular direction or type of crash or impact and may be used for different crash or impact scenarios, such as front, rear, side, off center, etc. vehicle crashes or impacts, rollover crashes or impacts (e.g., by various types of vehicles, such as automotive vehicles, etc.), vertical launches, landings, braking, emergency braking, crashes, or impacts (e.g., by spacecraft or aircraft), among other scenarios. For example, an example of the passive safety system may be installed suitably in a spacecraft or aircraft to reduce the rate of acceleration or deceleration of a subject of interest, during the corresponding launching or landing phase.

The exemplary embodiments are not limited to any particular combination of the described aspects and may include various combinations of some, or all, of the aspects described in the various examples.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein.

DETAILED DESCRIPTION OF THE EXEMPLARY EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

With reference to FIGS. 1-19, exemplary embodiments of a passive safety system will now be described.

Figure 1:
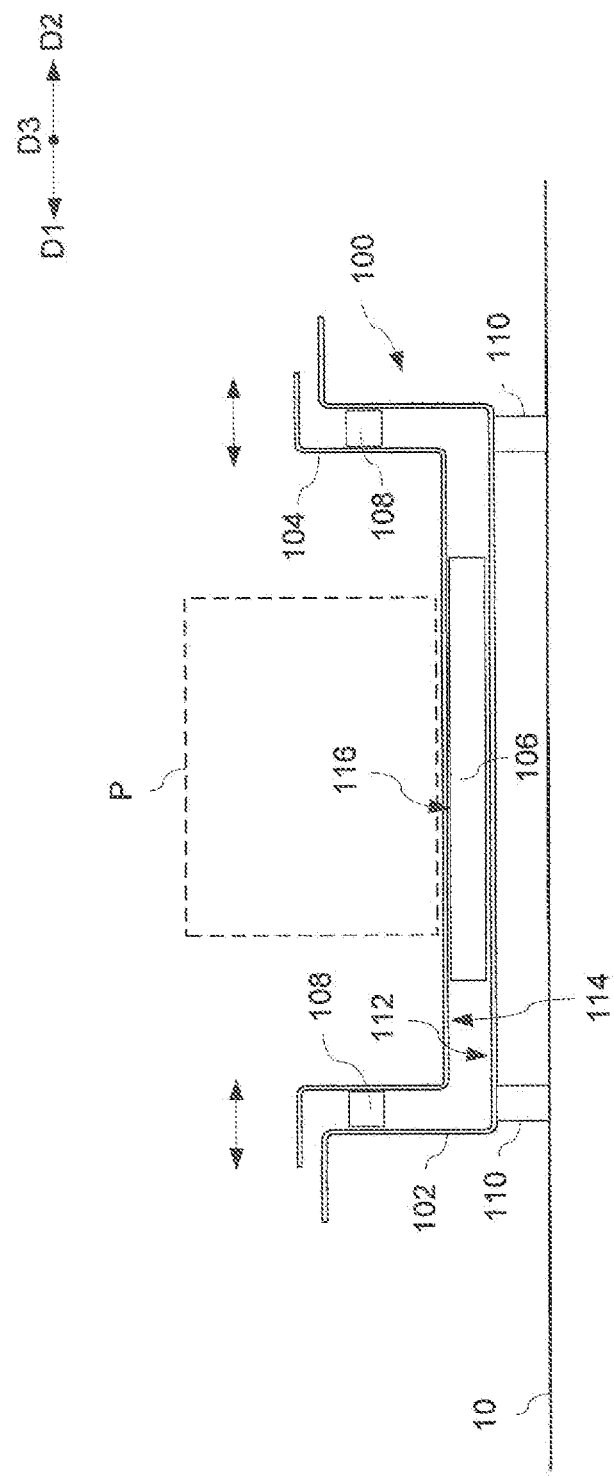
FIG. 1 is schematic side view of a passive safety system, according to an exemplary embodiment of the invention.
Figure 2:
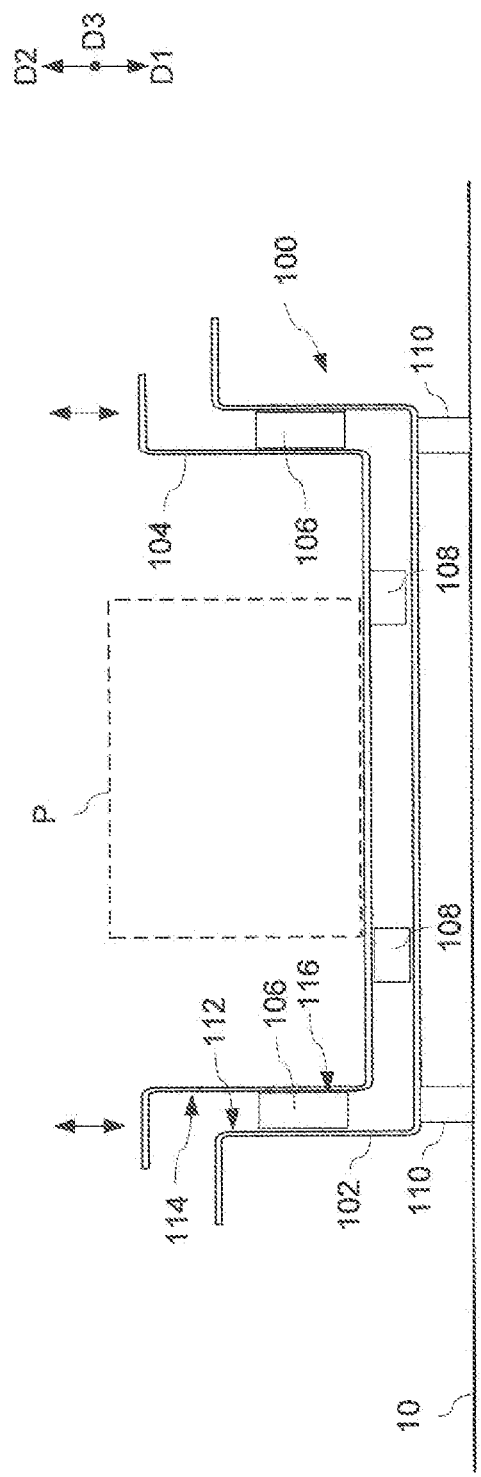
FIG. 2 is schematic side view of a passive safety system, according to an exemplary embodiment of the invention.

FIGS. 1 and 2 schematically illustrate examples of a passive safety system according to an exemplary embodiment of the invention.

As shown in FIG. 1, an example of a passive safety system 100 for a vehicle 10 can include a support frame 102 configured to be secured on the vehicle 10 in a fixed position. The support frame 102 can be coupled directly to a part of the vehicle 10 or can be supported on the vehicle 10 in a fixed position, for example, such as by support legs 110. The passive safety system 100 can include a support surface 104 configured to support a payload P carried by the vehicle. The payload can be directly supported by the support surface or the other components or structures can be mounted on or coupled to the support surface for supporting and/or securing the payload P, such as a seat assembly including a seat bottom, seat back, seatbelts, etc., a cargo platform, among other things. The passive safety system 100 is not limited to supporting a single type or quantity of a payload and can be configured to support a single payload or a plurality of payloads, one or more different types of payloads, etc.

As shown in FIG. 1, the support surface 104 can be movable with respect to the support frame 102. An energy conversion device 106 can be provided between the support frame 102 and the support surface 104. The energy conversion device 106 can include a frictional surface 116 configured to engage a portion (e.g., surface 114) of the support surface 104 when the support surface 104 moves in a predetermined direction based on vehicle's inertial direction, for example, during a front or a rear crash (e.g., direction D1, D2) with respect to the support frame 102.

The energy conversion device 106 can be coupled to the support frame 102, such that the energy conversion device 106 is rigidly fixed with respect to the support frame 102. The frictional surface 116 of the energy conversion device 106 can be configured to move or impart a relative motion on a portion (e.g., 114) of the support surface 104, in a direction (e.g., D2) opposite to a predetermined direction (e.g., D1). Alternatively, in other examples, the energy conversion device 106 can be coupled to the support surface 104, such that the energy conversion device 106 is rigidly fixed with respect to the support surface 104 and the energy conversion device 106 is instead configured to move, or impart a relative motion on a portion (e.g., 112) of the support frame 102, in a direction (e.g., D2) opposite to the predetermined direction (e.g., D1) to thereby convert kinetic energy of the support surface into frictional energy.

The frictional surface 116 of the energy conversion device 106 can include any suitable device capable of moving, or imparting a relative motion on a portion (e.g., 114) of the support surface 104, in a direction (e.g., D2) opposite to a predetermined direction (e.g., D1), such as one or more of a belt having a surface that frictionally engages the portion of the support surface 104, one or more rollers, wheels, tumblers, or the like configured to rotate in an opposite direction to the predetermined direction such that a surface of the one or more rollers, wheels, tumblers, or the like frictionally engages the portion of the support surface 104 when the support surface 104 moves in the predetermined direction. The energy conversion device 106 can include one or more frictional surfaces 116, such as one or more belts, rollers, wheels, tumblers, or the like. The one or more frictional surfaces 116 can be configured to move or impart a relative motion on one or more portions 114 of the support surface 104 in the same direction or in different directions.

In the example shown in FIG. 1, the frictional surface 116 of the energy conversion device 106 and the portion of the support surface 104 are illustrated as being parallel to the mounting portion of the vehicle 10. However, in other examples, the frictional surface 116 of the energy conversion device 106 may be disposed at another angle with respect to the portion of the support surface 104 and/or with respect to other components, such as the vehicle 10 (e.g., vehicle floor), support frame, etc.

In the example shown in FIG. 1, the passive safety system 100 optionally can further comprise a contact arrester mechanism 108 configured to arrest a movement of the support surface 104 with respect to the support frame 104. For example, the contact arrester mechanism 108 can include a device configured to secure, lock, or arrest a movement of the support surface 104 with respect to the support frame 104 in a first state and, in response to a signal from the vehicle, to permit the movement of the support surface 104 with respect to the support frame 102 in a second state. In another example, the contact arrester mechanism 108 can include one or more springs disposed between the support surface 104 and the support frame 102. One or more contact arrester mechanisms 108 can be provided at one or more locations between the support surface 104 and the support frame 102. One or more contact arrester mechanisms 108 can be arranged, for example, between one or more edges of the support frame 102 and the support surface 104, or between flanges formed thereon, to arrest the movement of the support surface 104. The contact arrester mechanism 108 can be configured to release automatically upon detection of a collision or impact by the vehicle sensors and can be configured to assist with establishing physical contact or engagement between the frictional surface 116 of the energy conversion device 106 and the portion 114 of the support surface 104.

Alternatively, in other examples, the energy conversion device can be coupled directly to the vehicle 10 (for instance, directly on a vehicle surface) or integrated into the vehicle (for instance, integrally formed with a vehicle surface) without the need for a support frame 102 or support legs 110 (e.g., separate support frame 102 or support legs 110). In such examples, the contact arrester mechanism 108 can be configured between the vehicle 10 (or a part of the vehicle 10) and the support surface 104 to secure, lock, or arrest a movement of the support surface 104 with respect to the vehicle 10 (or part of the vehicle 10).

The support surface 104 can be configured to move in any direction (e.g., D1, D2, D3, or another direction) and in one or more of such directions. Similarly, the frictional surface 116 of the energy conversion device 106 can be configured to move or impart a relative motion in any direction (e.g., D1, D2, D3, or another direction) and in one or more of such directions.

In other examples, the support surface 104 can be configured to float with respect to the support frame 102 such that there is no movement, or substantially no movement, of the support surface 104 relative to the support frame 102 (or relative to the vehicle 10 or part of the vehicle 10) when the vehicle 10 is subject to inertial forces.

With reference to FIG. 2, another example of a passive safety system 100 for a vehicle 10 can include a support frame 102 configured to be secured on the vehicle 10 in a fixed position and a support surface 104 configured to support a payload P carried by the vehicle. In this example, the support surface 104 can be configured to be vertically movable with respect to the support frame 102. One or more energy conversion devices 106 can be provided between the support frame 102 and the support surface 104, such as between each side of the support frame 102 and the support surface 104, and the one or more energy conversion devices 106 can include a frictional surface 116 configured to engage one or more portions (e.g., surface 114) of the support surface 104 when the support surface 104 moves in a predetermined direction (e.g., direction D1, D2) with respect to the support frame 102. As with the example illustrated in FIG. 1, the passive safety system 100 shown in the example of FIG. 2 optionally can comprise a contact arrester mechanism 108. The support surface 104 can be configured to move in any direction (e.g., D1, D2, D3, or another direction) and in one or more of such directions. Similarly, the frictional surface 116 of the energy conversion device 106 can be configured to move or impart a relative motion in any direction (e.g., D1, D2, D3, or another direction) and in one or more of such directions.

FIGS. 3-7 illustrate an example of a passive safety system embodied in a vehicle seat, such as an automotive vehicle seat.

Figure 3:
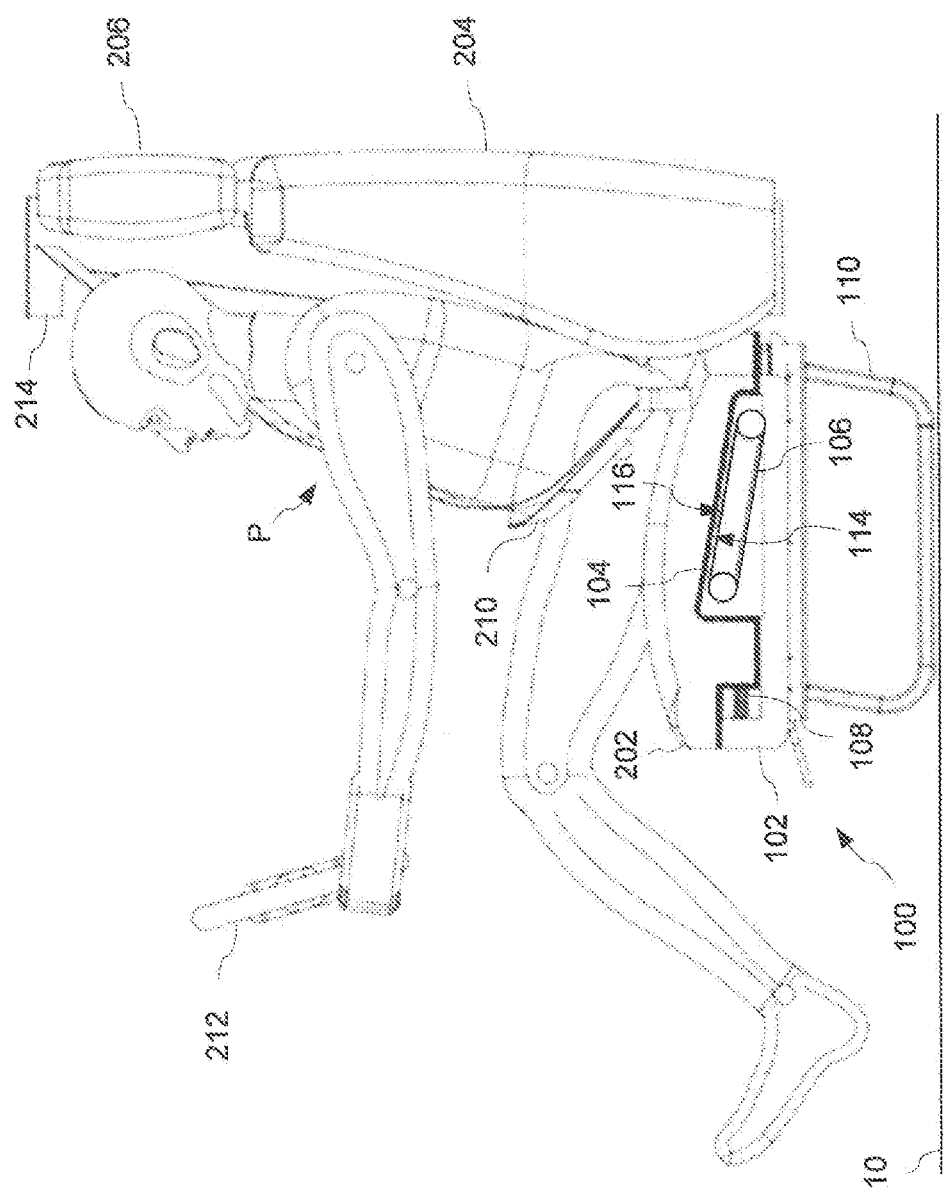
FIG. 3 is a side view of a passive safety system at an initial position, according to an exemplary embodiment of the invention.
Figure 4:
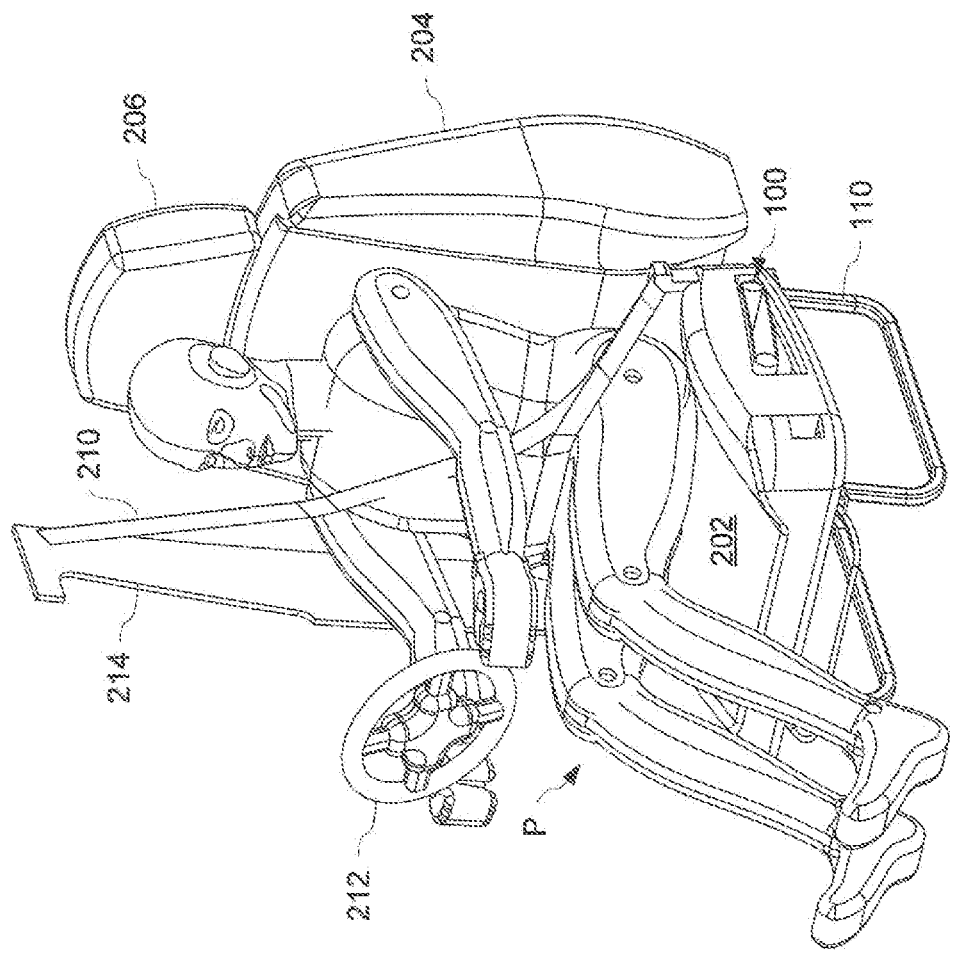
FIG. 4 is a isometric view of a passive safety system at an initial position, according to an exemplary embodiment of the invention.
Figure 5:
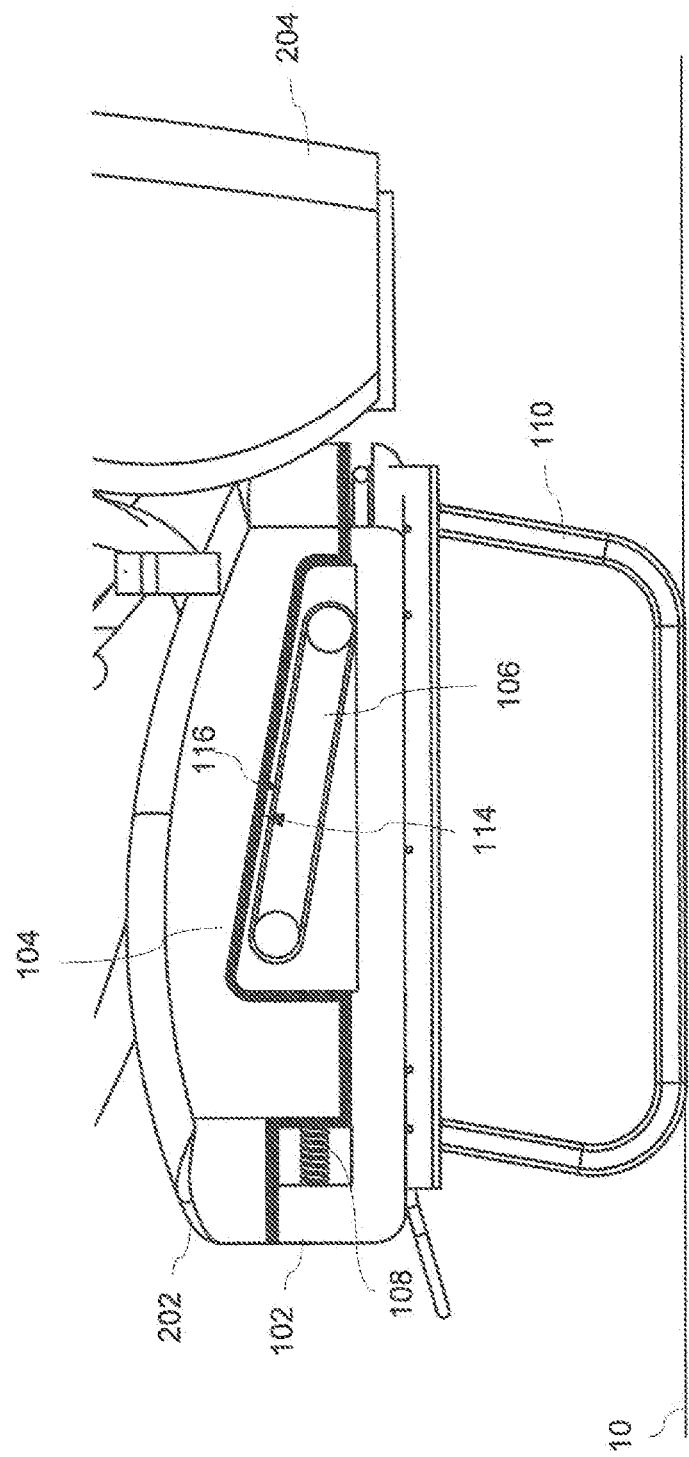
FIG. 5 is a side view of a passive safety system with the seat zoomed at an initial position, according to an exemplary embodiment of the invention.

For example, FIGS. 3-5 illustrate the driver seat setup within a passenger vehicle, with a passive safety system 100 at an initial position. In this example, the passive safety system comprises a seat support frame 102 that is rigidly fixed to a vehicle 10 (e.g., a vehicle floor) by seat support legs 110. The driver seat setup includes a seat cushion 202, seat back 204, headrest 206, and seat belt 210 secured to a part of the vehicle (e.g., a pillar of the vehicle frame). The vehicle steering wheel 212 also is conceptually illustrated. The seat cushion 202 supports a passenger (e.g., payload P) and is mounted on top of the seat support frame 102. The seat frame and design is not limited to any particular arrangement. The seat frame design and configuration may vary according to a seating type (e.g., single, double, or multiple occupancy). For example, a multiple occupant seat at a rear end of a vehicle may have a lengthier seat frame with a different design or structure, supported by a larger number of legs, to accommodate the lengthier seat carrying multiple occupants.

As shown in the enlarged partial view illustrated in FIG. 5, in this illustrative example, a lower surface (e.g., lower, metallic and abrasive portion) of a support surface 104, which is under the seat cushion 202 between the seat support frame 102 and the seat cushion 202, can be configured such that the lower surface 114 is capable of moving (e.g., sliding or translating) in any direction on a horizontal plane (either longitudinally, laterally or diagonally at any angles) in accordance with the direction of action of inertial force acting on the seat, which in turn depends on a deceleration direction of the vehicle 10. Originally, the sliding movement of seat cushion along the seat frame is arrested by means of a spring force 108.

In this example, the seat cushion 202 is mounted on the support surface 104 such that the movement of the support surface 104 with respect to the seat support frame 102 is initially constrained or arrested in one or more (e.g., all) directions, for example, by one or more contact arrester mechanisms 108 (e.g., by a spring force). Upon release of the constraints (e.g., 108), the support surface 104 will be able to slide or translate in any direction along the seat support frame 102, on its horizontal plane. Apart from mechanical means, the arresting force may also be generated electrically, magnetically, etc. or by other means.

In this example, an energy absorption device 106 is sandwiched between the seat support frame 102 and support surface 104, which initially has no contact with the support surface 104. The energy conversion device 106 can include a frictional surface 116 that extends along the seat's length and width direction. The energy conversion device 106 is sandwiched between the seat support frame 102 and the support surface 104 forming a lower portion of seat cushion 202. The support surface 104 of the seat cushion 202 is mounted such that its movement is constrained in all directions initially and a portion 114 (e.g., lower metallic portion) of the support surface 104 has no contact with the frictional surface 116 of the energy conversion device 106.

Figure 6:
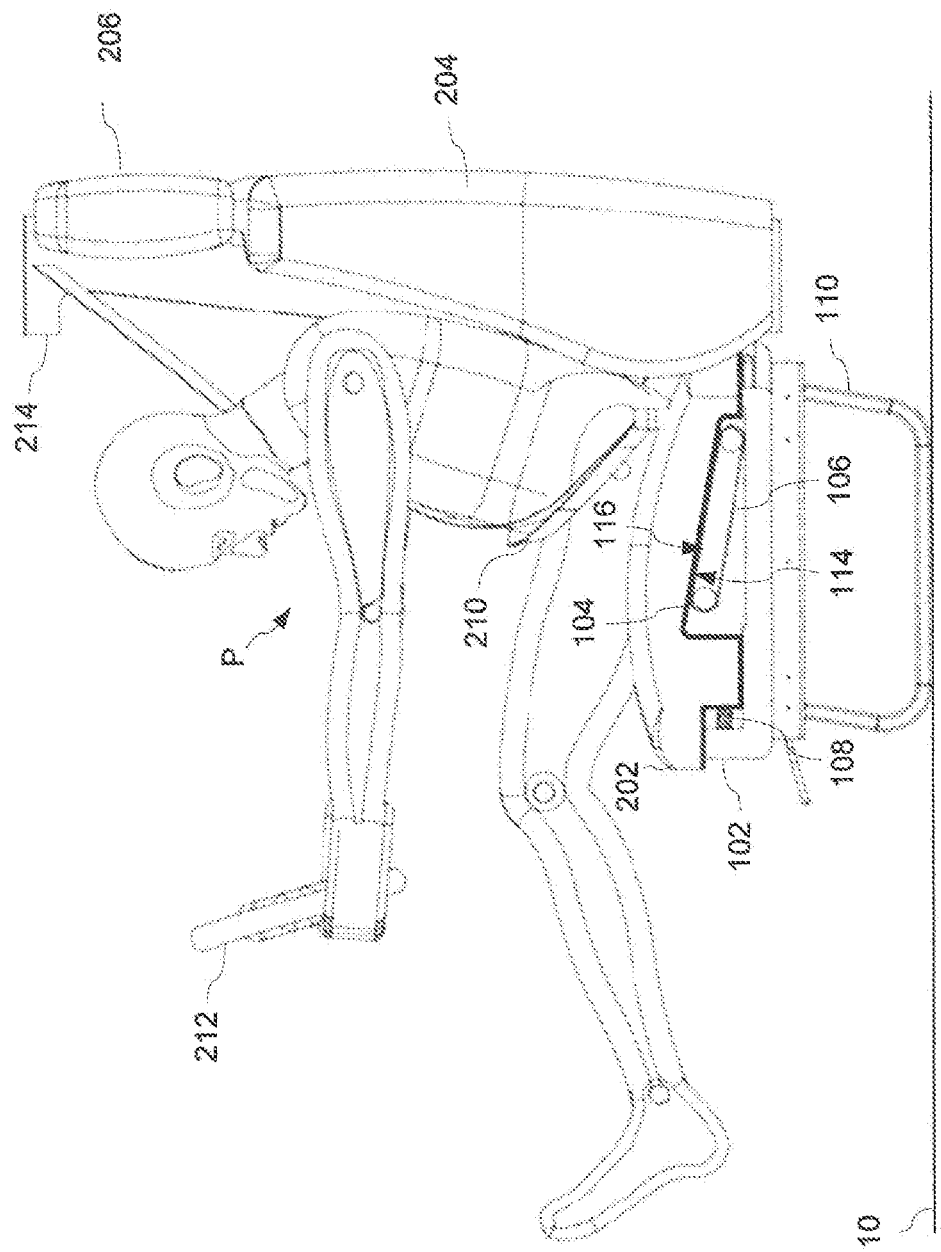
FIG. 6 is a side view of crash dummy in a stretched position during a crash.
Figure 7:
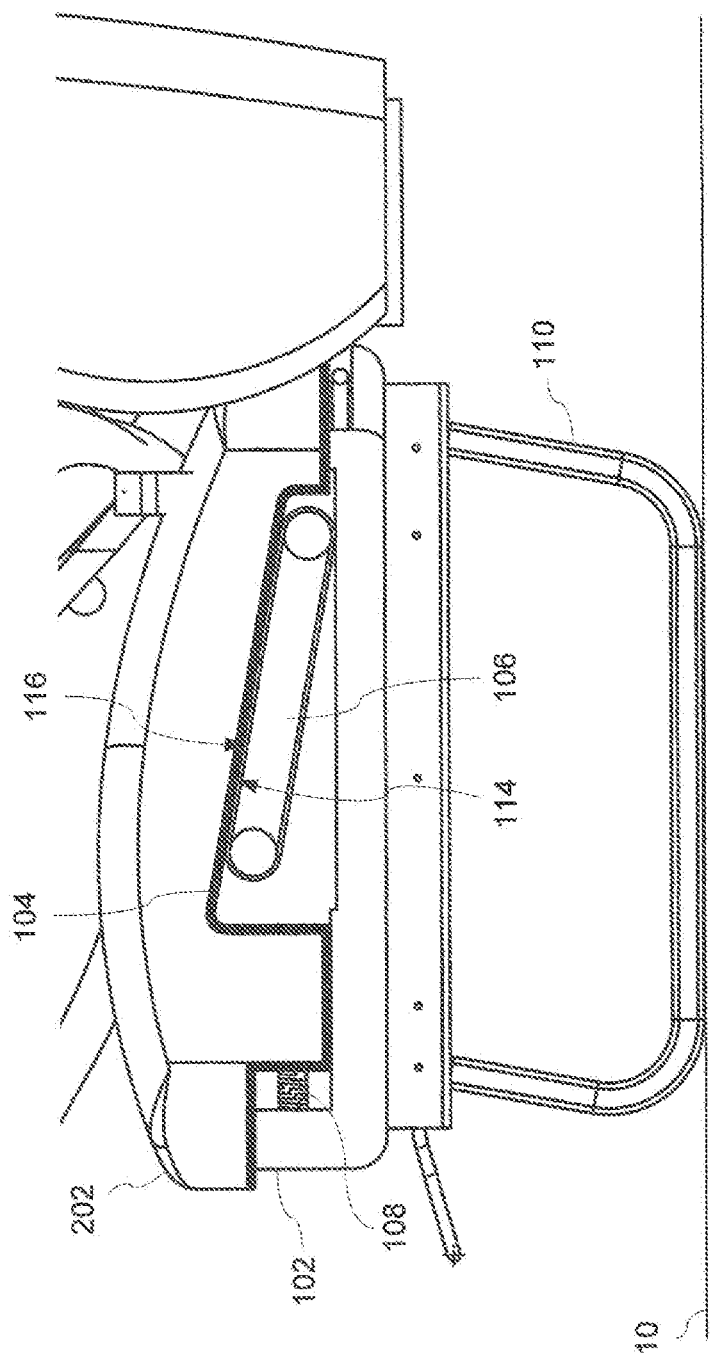
FIG. 7 is a side view of the lower portion of a seat assembly of a passive safety system during a crash, according to an exemplary embodiment of the invention.
Figure 8:
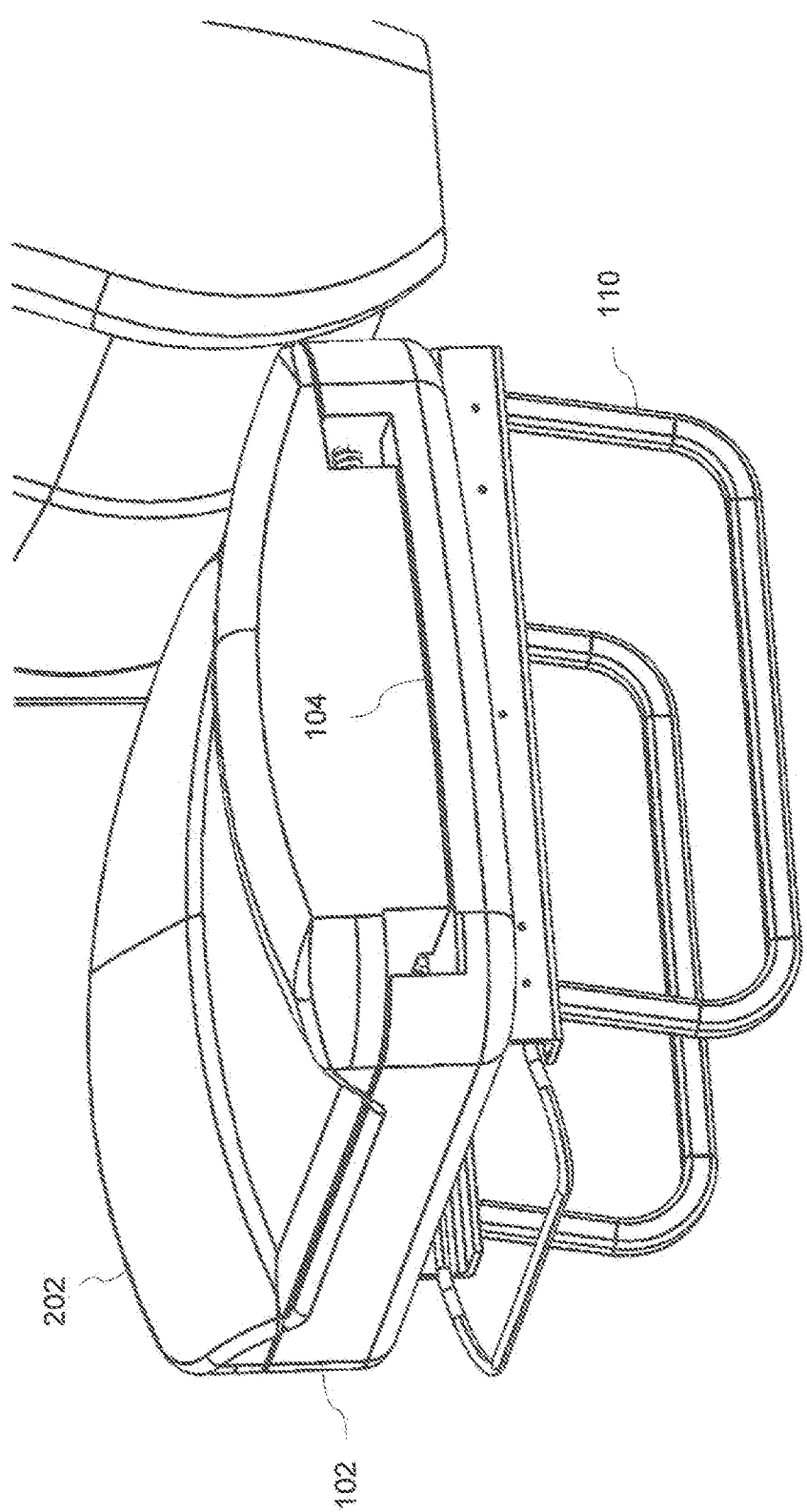
FIG. 8 is perspective view of a seat assembly having a passive safety system, according to an exemplary embodiment of the invention.
Figure 9:
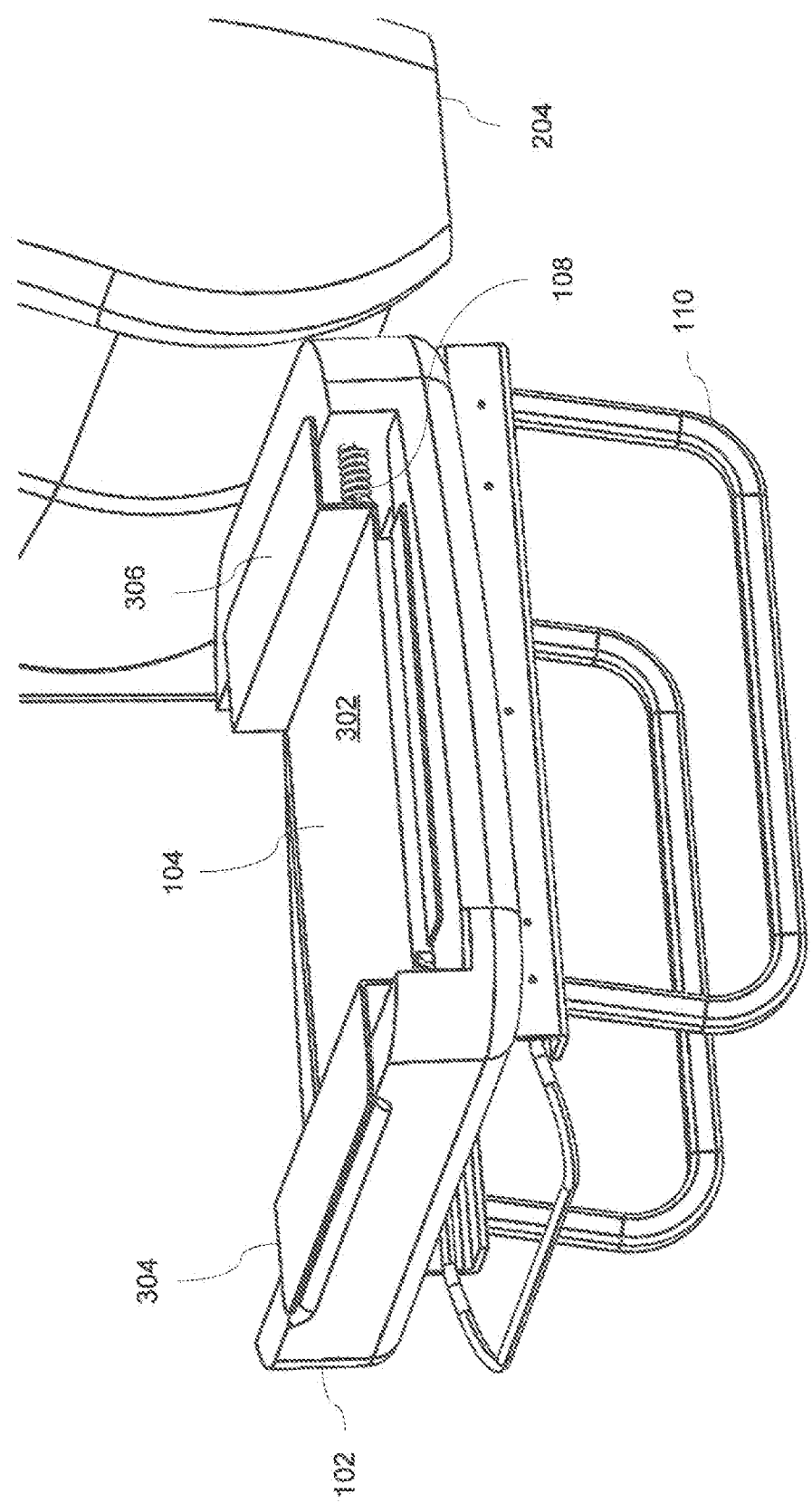
FIG. 9 is another perspective view of the seat assembly of the passive safety system of FIG. 8 with the seat cushion removed.
Figure 10:
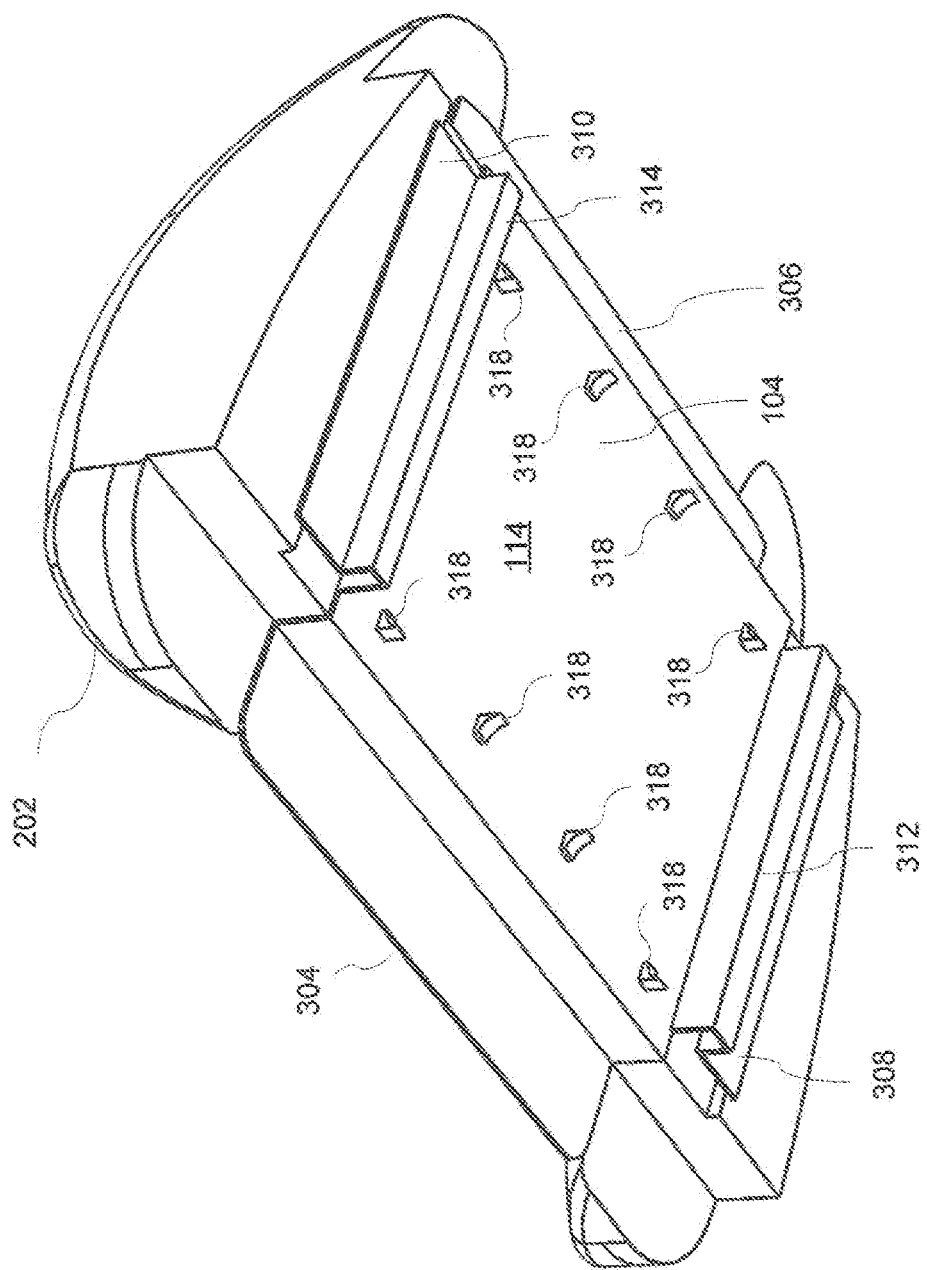
FIG. 10 is a partial lower perspective view showing a support surface and seat cushion of the seat assembly of the passive safety system of FIG. 8.
Figure 11:
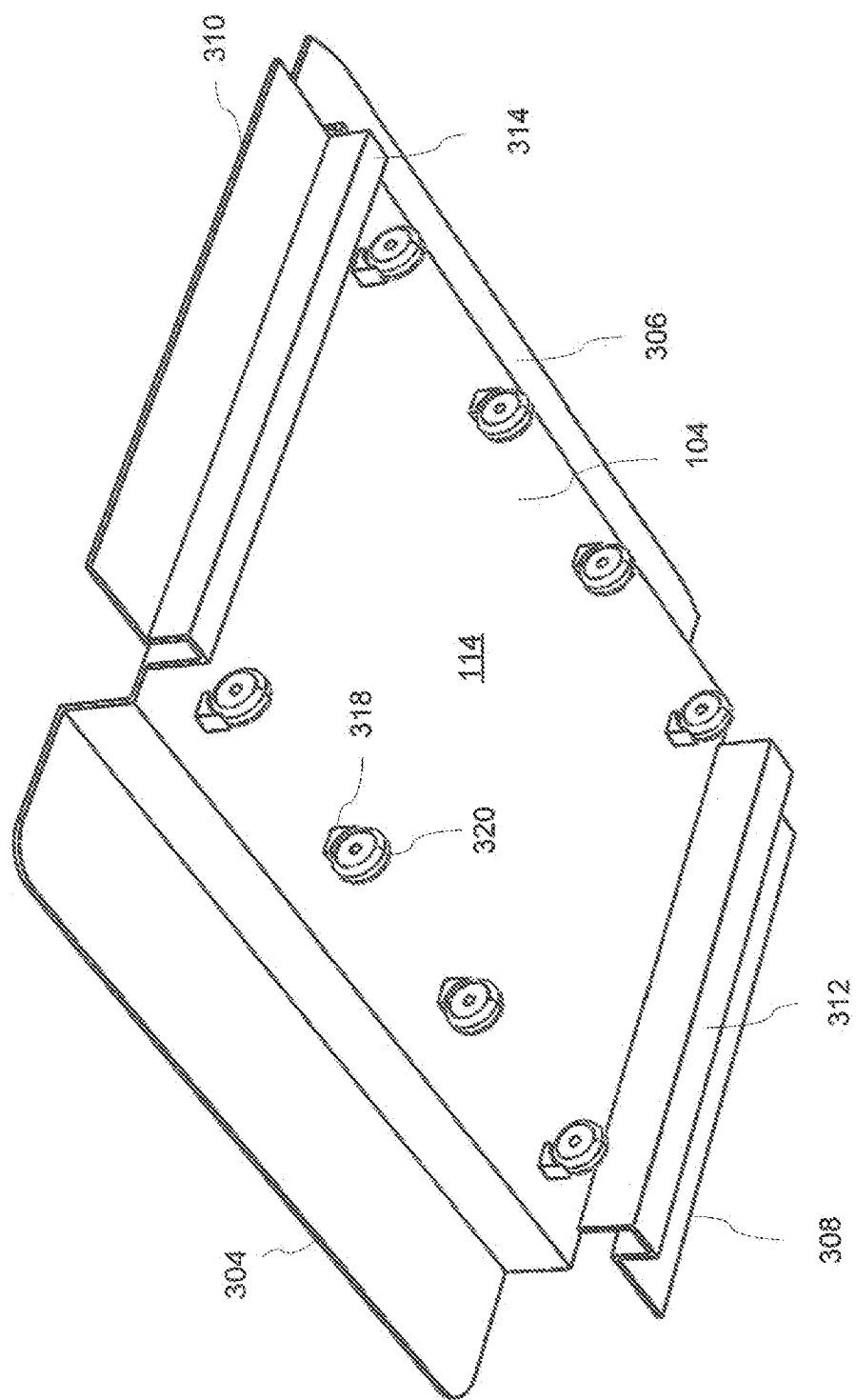
FIG. 11 is another partial lower perspective view showing the support surface and energy conversion device of the seat assembly of the passive safety system of FIG. 8.
Figure 12:
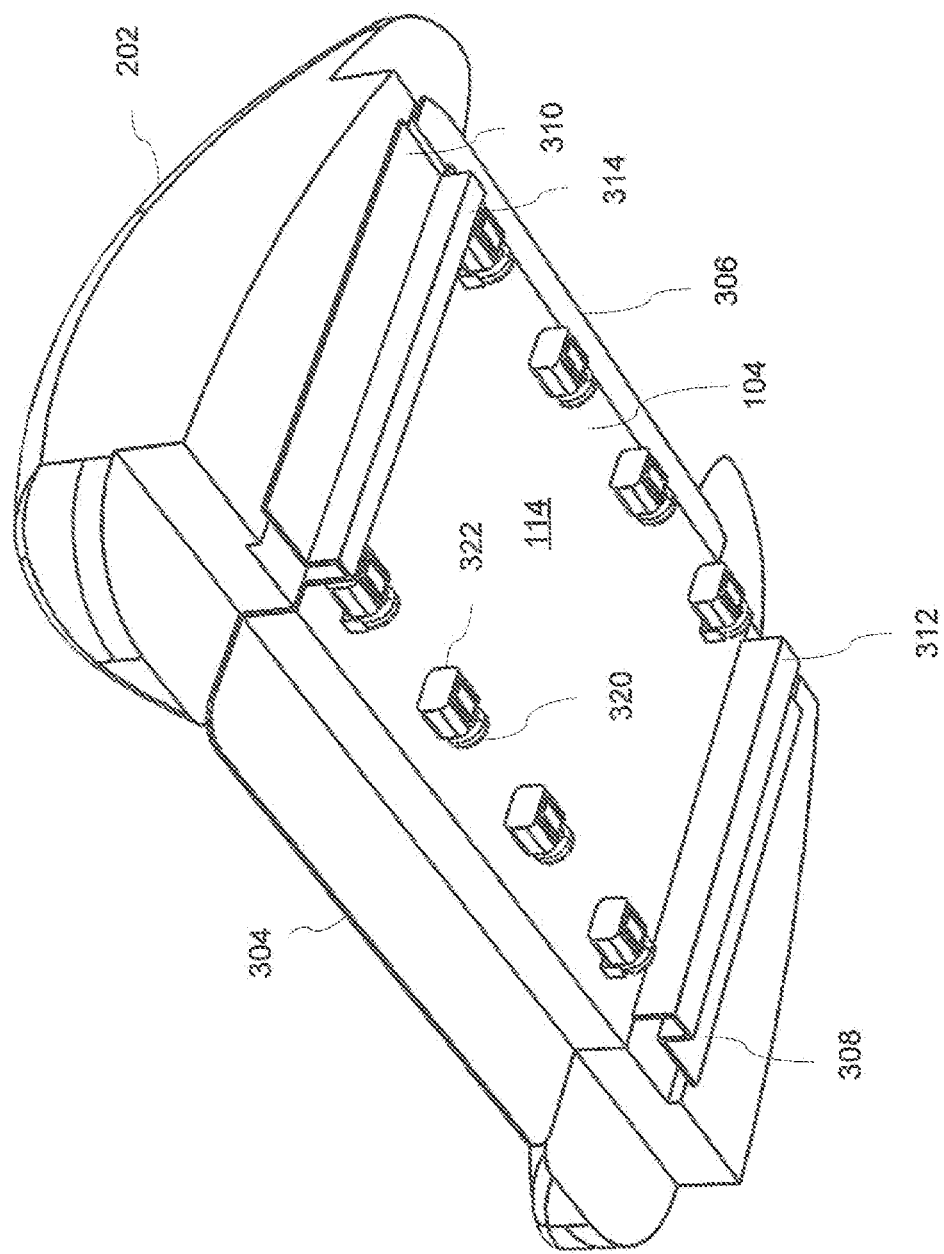
FIG. 12 is another partial lower perspective view showing the support surface, seat cushion, and energy conversion device of the seat assembly of the passive safety system of FIG. 8.
Figure 13:
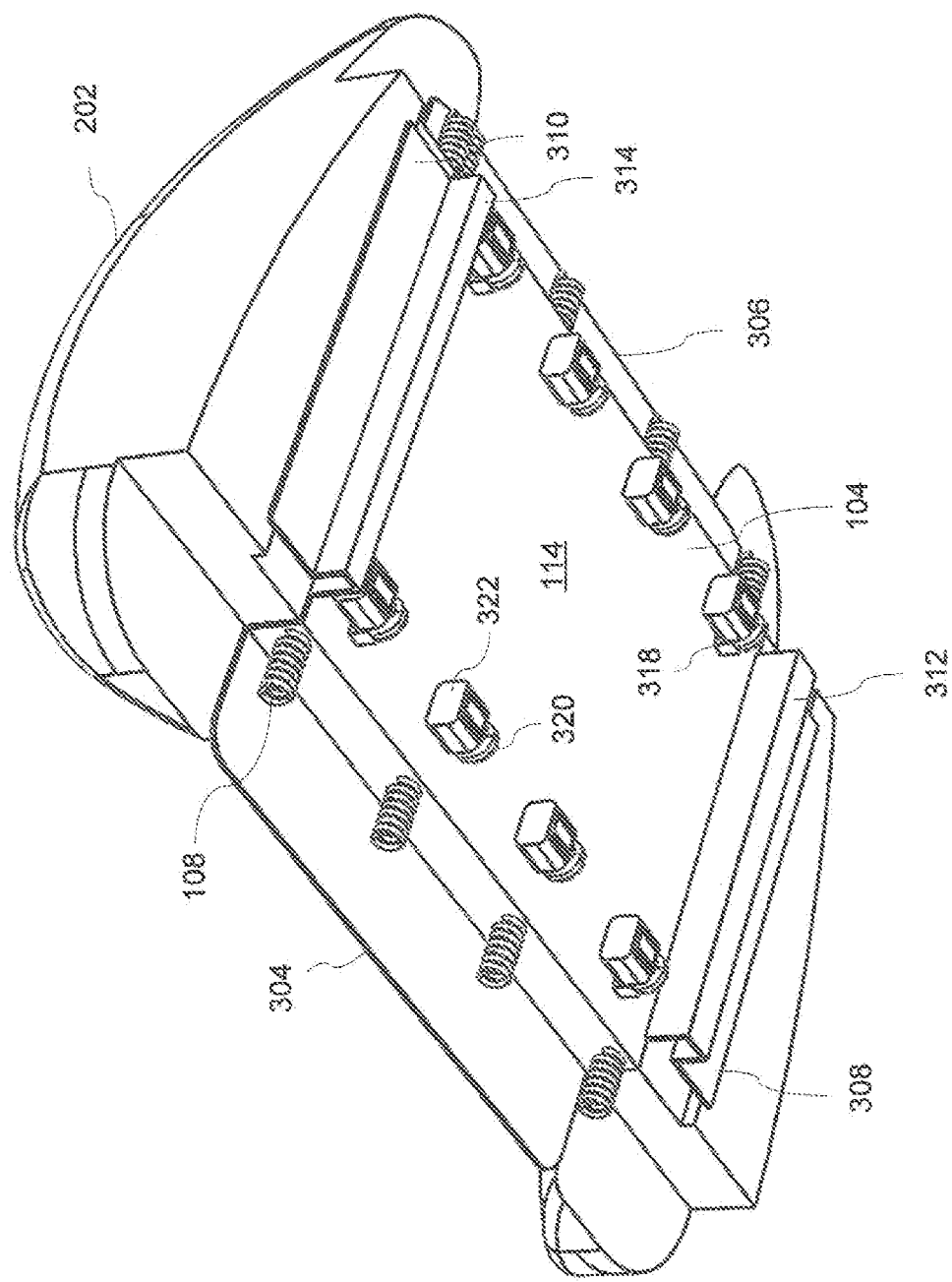
FIG. 13 is another partial lower perspective view showing the support surface, seat cushion, energy conversion device, and spring assembly of the seat assembly of the passive safety system of FIG. 8.
Figure 14:
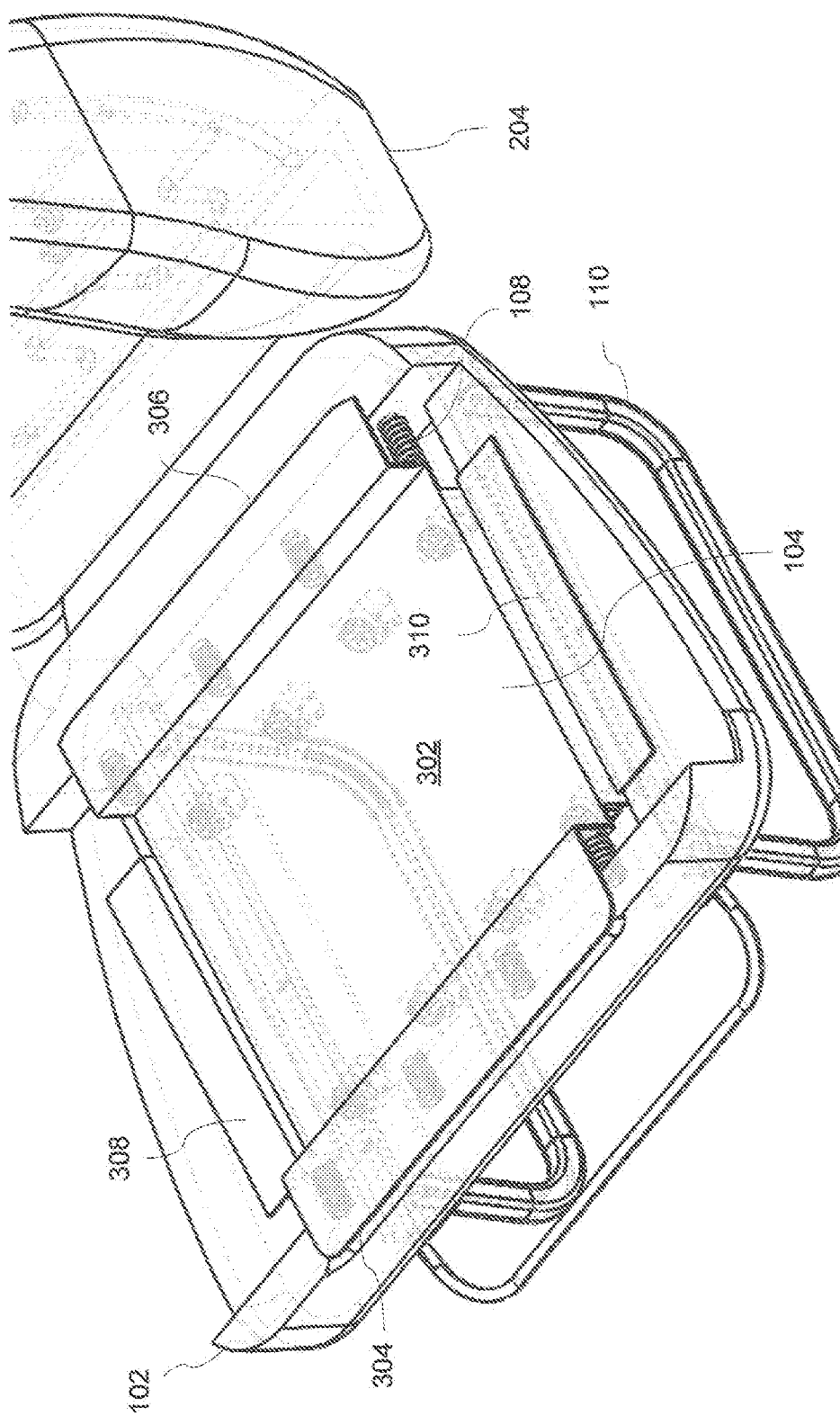
FIG. 14 is another partial perspective view of the seat assembly of the passive safety system of FIG. 8.
Figure 15:
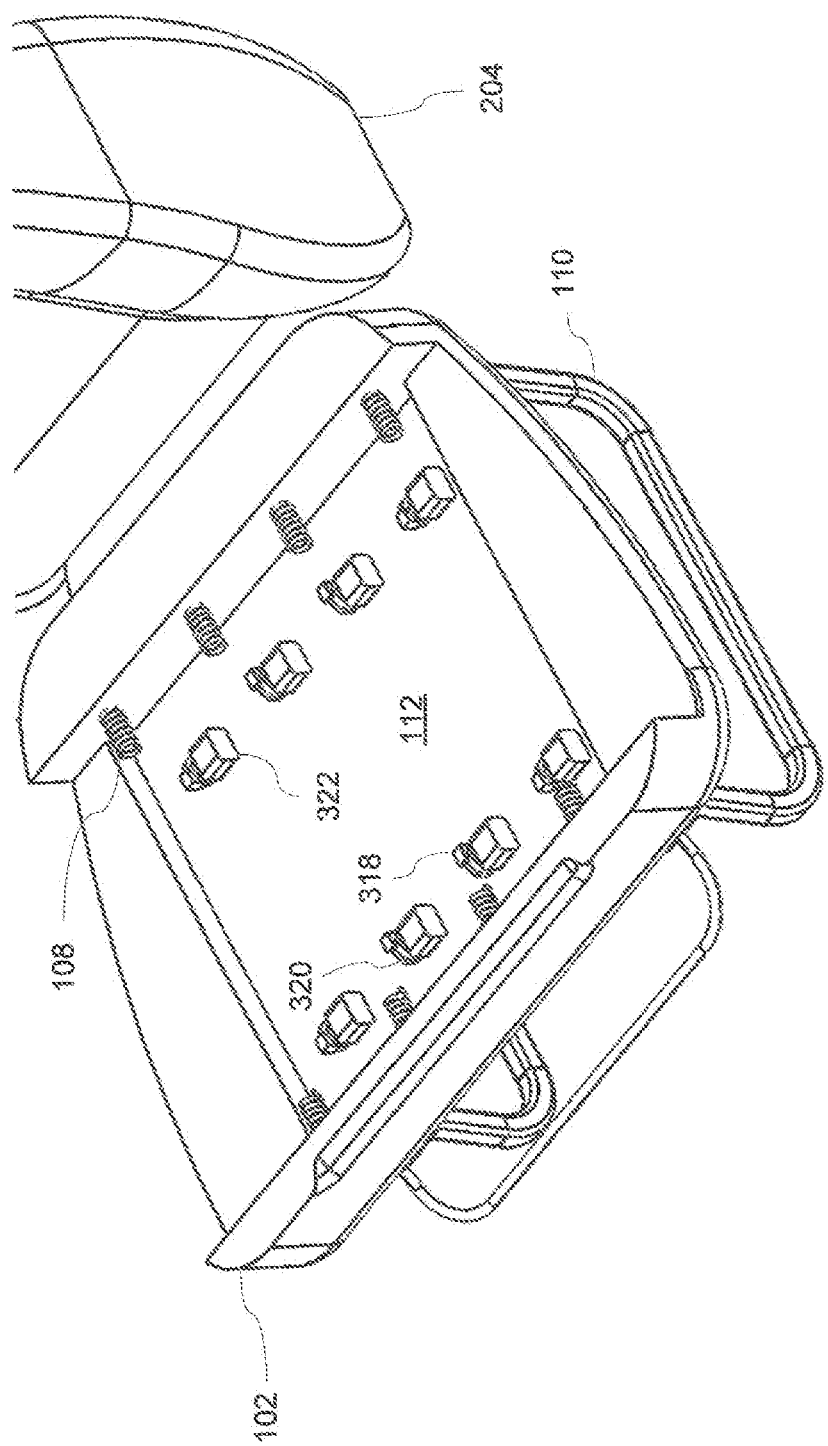
FIG. 15 is another partial perspective view of the seat assembly of the passive safety system of FIG. 8, with the support surface and seat cushion removed.
Figure 16:
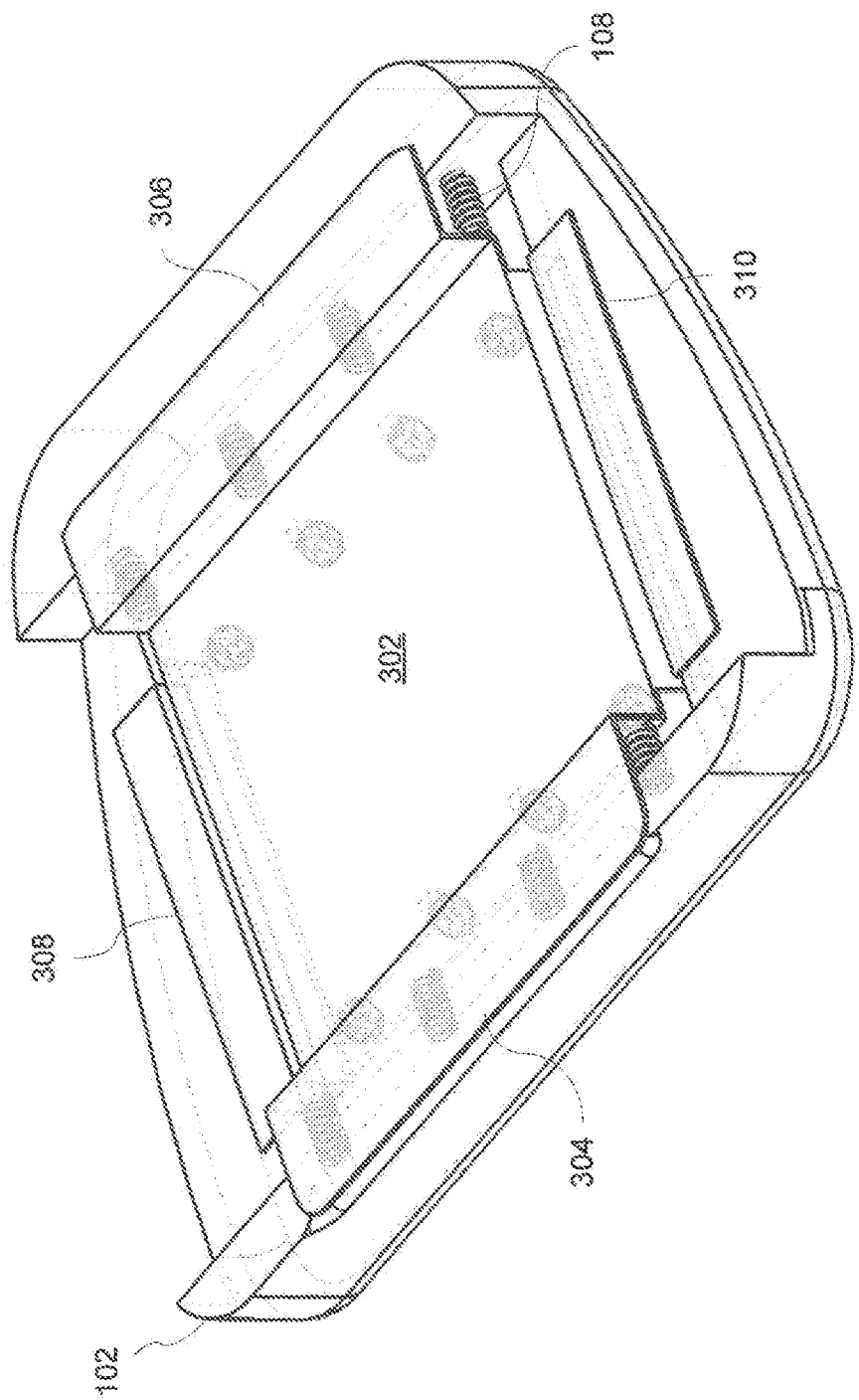
FIG. 16 is another partial lower perspective view showing the support surface and seat frame of the seat assembly of the passive safety system of FIG. 8.
Figure 17:
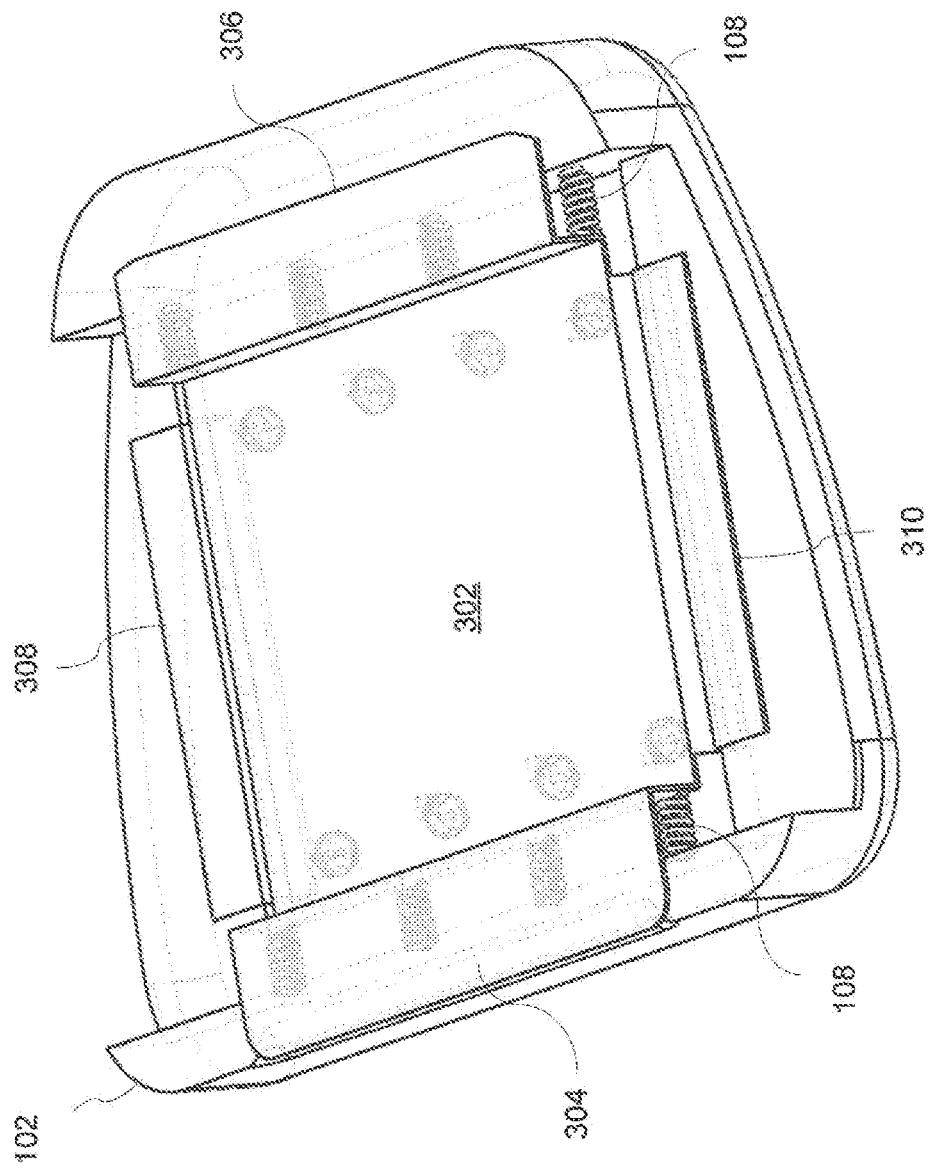
FIG. 17 is another partial lower perspective view showing the support surface and seat frame of the seat assembly of the passive safety system of FIG. 8.

FIGS. 6 and 7 illustrate the exemplary driver seat setup with a dummy/occupant P in a stretched position during a crash or impact of the vehicle 10. As shown in FIGS. 6 and 7, one of ordinary skill in the art will recognize that the occupant P tends to move forward due to inertial force resulting from a front crash, as illustrated in this example.

Once an imminent collision is predicted by one or more of the vehicle sensors, the movable frictional surface 116 of the energy absorption device 106 slides in opposite direction to that of the vehicle's inertial direction. As shown in FIGS. 6 and 7, once the vehicle 10 starts to decelerate during a collision, inertial force on the seat cushion 202, and by extension support surface 104, helps to overpower the constraints 108 and allows the seat cushion 202 and the support surface 104 to slightly slide or translate (e.g., by few millimeters) over the support frame 102 (e.g., over one or more guides provided on top of the seat frame 102) and to rub against the energy absorption device 106 positioned in immediate proximity. As a lower surface 114 (e.g., lower, metallic and abrasive portion) of the support surface 104 of the seat cushion 202 comes into contact with the "moving frictional surface" 116 of the energy absorption device 106, kinetic energy of the passenger is converted into frictional energy and the heat is dissipated to the surrounding environment.

In the example illustrated in FIGS. 3-7, the frictional surface 116 can be configured similar to that of a treadmill surface and can be powered by an electric motor and set into, for example, clockwise motion (according to FIGS. 6-7) upon detection of an imminent front collision by vehicle sensors. In this example, during a frontal collision, the inertial force generated by the combination of the seat cushion 202 and occupant P, is designed to overcome the spring force 108 such that the seat cushion 202 and support surface 104 are then able to slide over the seat support frame 102 and are made to rub and/or rest over the frictional surface 116 of the energy conversion device 106, positioned beneath the support surface 104. When the moving treadmill-like frictional surface 116 comes into contact with the lower surface 114 of the support surface 104 (e.g., lower metallic portion) during a crash, the treadmill-like frictional surface 116 is made to rub and constantly move against the inertial direction of the seat cushion 202 and support surface 104 (based on front, rear or side collision), both during and after braking, collision, etc., thereby converting the kinetic energy of the passenger P into frictional energy, until the passenger P comes to a halt (e.g., until inertial forces cease). Thus, the kinetic energy of the passenger P is alleviated by offering frictional resistance to the seat cushion 202 and support surface 104 (e.g., floating passenger seat) on which the passenger P is seated.

In contrast to conventional designs, the exemplary passive safety system 100 according to the invention provides advantages in that the deceleration of the occupant P is achieved without much altering of the position of the seat (e.g., seat cushion 202) with respect to the vehicle structure 10. That is, in this example, a position of the seat cushion 202 is almost unaltered (i.e., substantially unaltered or substantially stationary) relative to the vehicle 10, during its operation. As a result, the occupant (e.g., payload P) generally remains stationary relative to the vehicle 10, while a portion of the system (e.g., sliding frictional surface 116 of energy absorption device 106), which holds the seat cushion 202 during a crash, moves relative to the seat resulting in increased stopping distance and a reduced rate of passenger deceleration.

In examples of the energy conversion device 106, the braking force used to decelerate the occupant may be mechanical (e.g., frictional energy as in the illustrated examples), magnetic levitation, electrical, etc. In other examples, the energy conversion device 106 may be powered by a pneumatic system, hydraulic system, controlled explosion similar to an airbag, etc. In some cases, the kinetic energy of the vehicle or a part of the vehicle shall be used to power the energy conversion device. After completion of crash and on rebound, the seat cushion 202 (and associated support surface 104) may be configured to spring back to its original/initial position.

In this example, by arranging the passive safety system 100 including an energy conversion device 106 beneath the occupant seat cushion 202, during a crash or impact, the passive safety system 100 can dissipate the kinetic energy and decelerates the occupant P, prior to the occupant P contacting with another safety device, such as an airbag, or any other vehicle structure, such as the steering wheel 212. An advantage of the exemplary passive safety system 100 is that the deceleration of the occupant P is achieved, without much altering the position of the seat (e.g., seat cushion 202, seat back 204, etc.) with respect to the vehicle structure 10. These features may be extremely useful as in some cases, there is not enough space available around the occupant P for smooth deceleration during a crash or impact of the vehicle 10 with another object or vehicle. While FIGS. 3-7 illustrate a single driver seat, other examples may be effectively used for front, rear or in-between rows consisting of single or multiple occupancy seats.

FIGS. 3-7 illustrate an exemplary passive safety system 100 in which the occupant seat cushion 202 attached with the support surface 104 slide over the seat support frame 102 during a crash and are made to rub and/or rest over the frictional surface 116 of the energy conversion device 106, which is positioned beneath the support surface 104, thereby dissipating the kinetic energy of payload P. In other examples, the energy conversion device 106 or its frictional surface 116 can be made to project outside or slide over the seat support frame 102 during a crash and establish contact with the now stationary support surface 104 attached to the occupant seat cushion 202, which makes the seat cushion 202 and support surface 104 completely stationary with respect to the vehicle 10. In other words, the payload P attached to, or supported by, the seat cushion 202 can be configured to float (i.e., configured to be stationary or substantially stationary relative to the vehicle 10) over the energy conversion device 106, while a portion of the system (e.g., sliding frictional surface 116 of energy absorption device 106), which holds the seat cushion 202 during a crash, braking, etc., moves in the opposite direction (i.e., against the vehicle's inertial direction) relative to the seat, resulting in increased stopping distance and a reduced rate of passenger deceleration.

FIGS. 8-17 illustrate another example of a passive safety system 100 for a vehicle 10, wherein the passive safety system 100 is embodied in a vehicle seat, such as an automotive vehicle seat. In this example, the passive safety system 100 for a vehicle 10 can include a support frame 102 configured to be secured on the vehicle 10 in a fixed position. The support frame 102 can be coupled directly to a part of the vehicle 10 or can be supported on the vehicle 10 in a fixed position, for example, such as by support legs 110. The passive safety system 100 can include a support surface 104 configured to support a payload P carried by the vehicle. In this example, the payload can be supported on an upper surface 302 of the support surface 104 by a seat assembly mounted thereon, including a seat bottom 202. The seat assembly also can include, for example, a seat back 204 attached separately with the support frame 102.

The support surface 104 can be movable with respect to the support frame 102. As shown in FIGS. 8-17, the support surface 104 can include flanges 304, 306, 308, 310, for example, for constraining movement of the support surface with respect to the fixed support frame 102. The support surface 104 can include guides 312, 314 for guiding a movement of the support surface 104 with respect to the fixed support frame 102 in at least a predetermined direction. The guides 312, 314 can cooperate with portions of the support frame 102 to facilitate such guiding.

In this example, the passive safety system 100 includes a contact arrester mechanism 108 configured to arrest a movement of the support surface 104 with respect to the support frame 102. For example, the contact arrester mechanism 108 can include a plurality of springs disposed between one or more edges of the support frame 102 and the support surface 104, or between flanges formed thereon, to arrest the movement of the support surface 104.

An energy conversion device (e.g., similar to 106 in FIGS. 1 and 2) can be provided between the upper surface 112 of the support frame 102 and the lower surface 114 of the support surface 104. The energy conversion device can include a plurality of frictional surfaces configured to engage corresponding portions 318 on the lower surface 114 of the support surface 104 when the support surface 104 tends to move in one or more directions with respect to the support frame 102. In this example, the plurality of frictional surfaces of the energy conversion device includes a plurality of rollers 320. The lower surface 114 of the support surface 104 includes a plurality of protruding surfaces 318 having a shape corresponding to a contact surface of each of the rollers 320.

Figure 18:
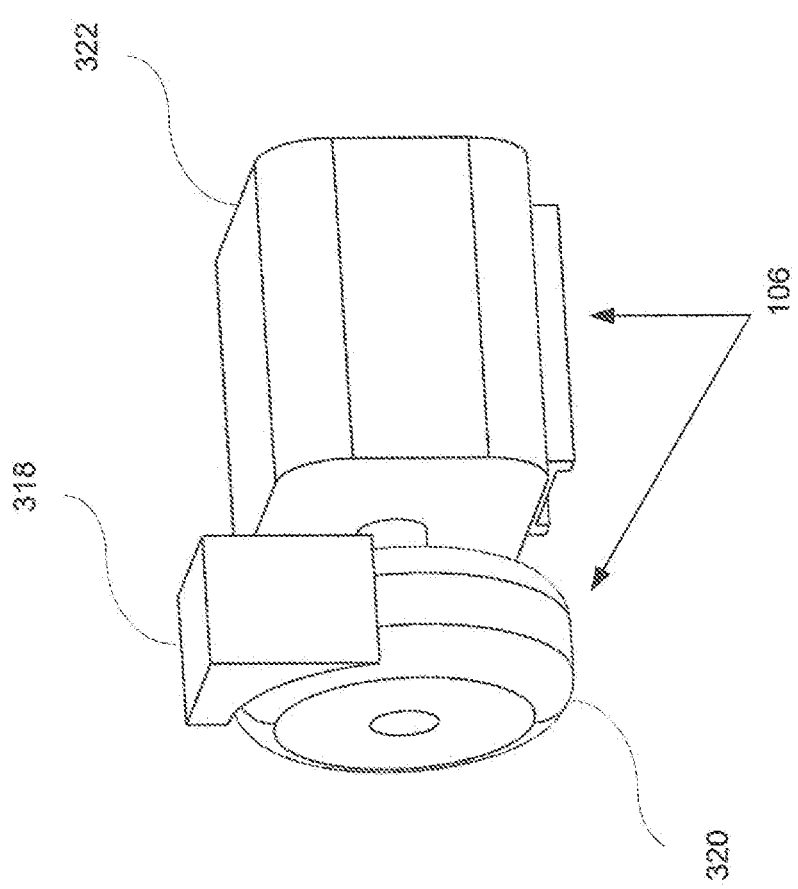
FIG. 18 is a perspective view of an energy conversion device of a passive safety system, according to an exemplary embodiment of the invention.

The rollers 320 and protruding surfaces 318 are spaced along forward and rearward edges of the lower surface 114 of the support surface 104. However, other arrangements are possible. Each of the rollers 320 can be powered by an electric motor 322. The electric motors 322 can be configured to be controlled (e.g., by a controller, for example, of the vehicle or a controller of the passive safety system 100) in response to one or more signals from one or more vehicle sensors, such as a sensor configured to detect an imminent collision. FIG. 18 illustrates an example arrangement of a protruding surface 318, roller 320, and electric motor 322. The combination of a roller 320 and an electric motor 322 can form an energy conversion device (e.g., 106 in FIGS. 1 and 2) and the protruding surface 318, which is attached with the support surface 104, can be configured to engage physically with the roller surface 320 during a crash, braking, etc. converting the kinetic energy of the payload P into frictional energy.

With reference, for example, in FIGS. 10-13, the protruding surfaces 318 can be arranged to face different directions. For example, the outer four protruding surfaces 318 face in one direction, while the inner four protruding surfaces 318 face in an opposite direction. The rollers 320 also can be configured to rotate in different directions. For example, the outer four rollers 320 can be configured to rotate in one direction, while the inner four rollers 320 are configured to rotate in an opposite direction.

Figure 19:
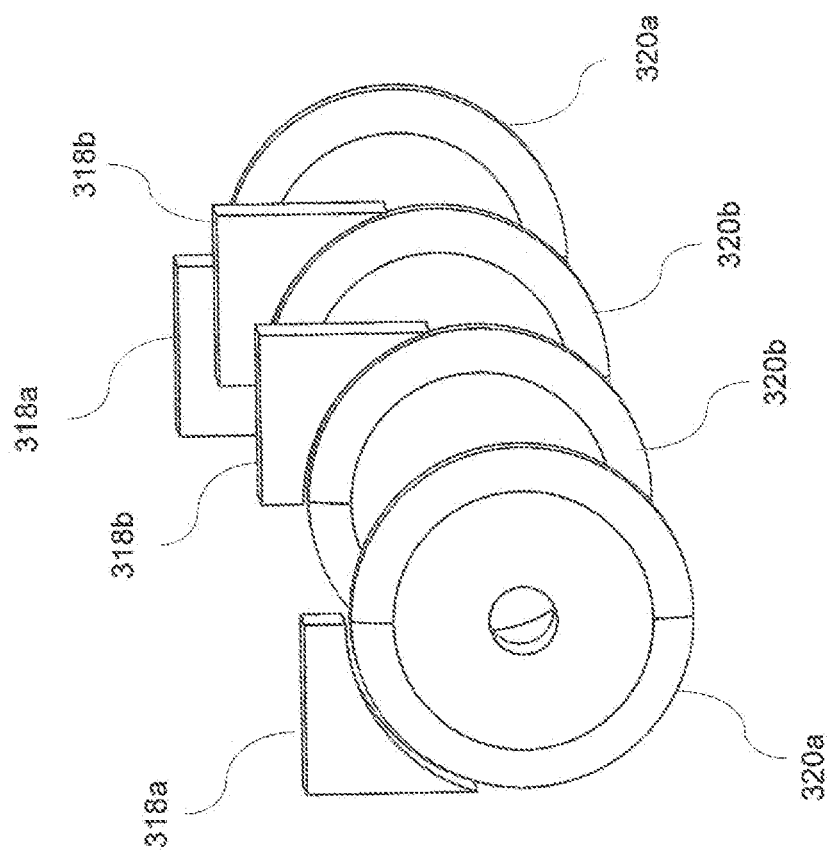
FIG. 19 is a perspective view of an energy conversion device of a passive safety system, according to an exemplary embodiment of the invention.

FIG. 19 illustrates an example arrangement of protruding surfaces 318a, 318b and rollers 320a, 320b. As shown, the outer protruding surfaces 318a face in one direction, while the inner protruding surfaces 318b face in an opposite direction. The rollers 320a also are configured to rotate in different directions. For example, the outer rollers 320a rotate in one direction, while the inner four rollers 320b rotate in an opposite direction.

When the support surface 104 moves in one direction, the first set of rollers 320a will rotate and frictionally engage the corresponding first set of protruding surfaces 318a of the support surface 104, and when the support surface 104 moves in an opposite direction, the second set of rollers 320b will rotate and frictionally engage the corresponding second set of protruding surfaces 318b of the support surface 104. In each case, the rollers 320 will rotate in a direction opposite to the direction of movement of the support surface 104.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. A passive safety system for a vehicle, the passive safety system comprising:
a support frame configured to be secured on the vehicle in a fixed position;
a support surface configured to support a payload carried by the vehicle, the support surface configured to float with respect to the support frame; and
an energy conversion device between the support frame and the support surface,
wherein, when the support surface tends to move in a predetermined direction with respect to the support frame as a result of inertial forces acting on the support surface during deceleration of the vehicle, the energy conversion device is configured to impart a relative motion on a portion of the support surface in a direction opposite to the predetermined direction to thereby convert kinetic energy of the support surface into frictional energy.

2. The passive safety system of claim 1, wherein the energy conversion device includes a frictional surface configured to engage a portion of the support surface when the support surface tends to move in the predetermined direction with respect to the support frame to thereby convert the kinetic energy of the support surface into the frictional energy.

3. The passive safety system of claim 1, wherein a stopping distance of the payload is increased during a crash without altering a position of the payload with respect to the vehicle or a structure to which the payload is attached on the vehicle but by moving the frictional surface of the energy conversion device on which the pay load is supported, thereby resulting in decreased deceleration of the payload leading to reduced risk of damage to the payload.

4. The passive safety system of claim 1, wherein the energy conversion device is coupled to the support frame.

5. The passive safety system of claim 2, wherein the frictional surface of the energy conversion device moves in an opposite direction to the predetermined direction.

6. The passive safety system of claim 2, wherein the frictional surface of the energy conversion device includes a belt configured to move in an opposite direction to the predetermined direction such that a surface of the belt frictionally engages the portion of the support surface.

7. The passive safety system of claim 2, wherein the frictional surface of the energy conversion device includes a roller configured to rotate in an opposite direction to the predetermined direction such that a surface of the roller frictionally engages the portion of the support surface when the support surface tends to move in the predetermined direction.

8. The passive safety system of claim 7, wherein the portion of the support surface includes a surface having a shape corresponding to the surface of the roller.

9. The passive safety system of claim 1, wherein at least one of the support surface and the support frame includes at least one guide for guiding a movement of the support surface with respect to the fixed support frame in at least the predetermined direction.

10. The passive safety system of claim 2, wherein the support surface is movable with respect to the support frame in at least the predetermined direction and an opposite direction to the predetermined direction, and
wherein the energy conversion device includes a second frictional surface configured to engage the support surface when the support surface tends to move in the opposite direction to the predetermined direction to thereby convert kinetic energy of the support surface into frictional energy.

11. The passive safety system of claim 2, wherein the support surface is movable with respect to the support frame in at least the predetermined direction and an opposite direction to the predetermined direction,
wherein the frictional surface of the energy conversion device is capable of moving in at least the predetermined direction and the opposite direction to the predetermined direction, and
wherein the frictional surface is configured to engage the portion of the support surface when the support surface tends to move in the predetermined direction and when the support surface tends to move in the opposite direction to the predetermined direction.

12. The passive safety system of claim 2, wherein the support surface is movable with respect to the support frame in at least the predetermined direction and an opposite direction to the predetermined direction, and wherein the frictional surface of the energy conversion device comprises a plurality of rollers including:
- at least a first roller configured to rotate in an opposite direction to the predetermined direction when the support surface tends to move in the predetermined direction such that a surface of the first roller frictionally engages the portion of the support surface, and
- at least a second roller configured to rotate in the predetermined direction when the support surface tends to move in the opposite direction to the predetermined direction such that a surface of the second roller frictionally engages a second portion of the support surface.

13. The passive safety system of claim 2, wherein the support surface is movable with respect to the support frame in at least the predetermined direction and an opposite direction to the predetermined direction,
wherein the portion of the support surface includes a plurality of first portions and a plurality of second portions, and
wherein the frictional surface of the energy conversion device comprises:
- a plurality of first rollers configured to rotate in an opposite direction to the predetermined direction when the support surface tends to move in the predetermined direction such that a surface of each of the plurality of first rollers frictionally engages one of the plurality of first portions of the support surface, and
- a plurality of second rollers configured to rotate in the predetermined direction when the support surface tends to move in the opposite direction to the predetermined direction such that a surface of each of the plurality of second rollers frictionally engages one of the plurality of second portions of the support surface.

14. The passive safety system of claim 2, wherein the support surface is movable with respect to the support frame in a plurality of directions including the predetermined direction, and
wherein the frictional surface of the energy conversion device is configured to engage with the portion of the support surface when the support surface tends to move in any of the plurality of directions to thereby convert kinetic energy of the support surface into frictional energy.

15. The passive safety system of claim 2, wherein the support surface is movable with respect to the support frame in a different direction from the predetermined direction and in a same plane as the predetermined direction, and
wherein the frictional surface of the energy conversion device is configured to engage with the portion of the support surface when the support surface tends to move in the different direction to thereby convert kinetic energy of the support surface into frictional energy.

16. The passive safety system of claim 2, wherein the energy conversion device is configured to receive, from a sensor of the vehicle, a signal representing a predetermined change in acceleration of the vehicle, and
wherein, in response to the signal, the energy conversion device is configured to engage the frictional surface with the portion of the support surface to thereby convert kinetic energy of the support surface into frictional energy.

17. The passive safety system of claim 16, further comprising:
a contact arrester mechanism configured to arrest a movement of the support surface with respect to the support frame in a first state and, in response to the signal from the vehicle, to permit the movement of the support surface with respect to the support frame in a second state.

18. The passive safety system of claim 1, further comprising:
a contact arrester mechanism configured to resist a movement of the support surface with respect to the support frame, the contact arrester mechanism comprising at least one spring disposed between the support surface and the support frame.

19. The passive safety system of claim 1, wherein the support frame comprises a seat frame fixedly mounted to the vehicle, and
wherein the support surface is a part of a seat of the vehicle.

20. The passive safety system of claim 1, wherein the support frame is integrally formed with a part of the vehicle.

* * * * *